United States Patent
Soltmann et al.

(10) Patent No.: US 12,454,158 B2
(45) Date of Patent: *Oct. 28, 2025

(54) PNEUMATIC CHUCK INCLUDING VALVE CORE INTERFACE

(71) Applicant: Dill Air Controls Products, LLC, Oxford, NC (US)

(72) Inventors: Sven A. Soltmann, Franklinton, NC (US); Brian P. Rigney, Raleigh, NC (US); Scott R. Lakin, Stem, NC (US); David Milo Hollinger, Roxboro, NC (US); Graham Kendall Snyder, Graham, NC (US); Kristopher Jon Soderstrom, Raleigh, NC (US)

(73) Assignee: Dill Air Controls Products, LLC, Oxford, NC (US)

( * ) Notice: Subject to any disclaimer, the term of this patent is extended or adjusted under 35 U.S.C. 154(b) by 60 days.

This patent is subject to a terminal disclaimer.

(21) Appl. No.: 18/594,524

(22) Filed: Mar. 4, 2024

(65) Prior Publication Data

US 2024/0208282 A1    Jun. 27, 2024

Related U.S. Application Data

(63) Continuation of application No. 17/323,582, filed on May 18, 2021, now Pat. No. 11,919,338.
(Continued)

(51) Int. Cl.
*B60C 29/00* (2006.01)
*B23B 31/177* (2006.01)
(Continued)

(52) U.S. Cl.
CPC ............ *B60C 29/00* (2013.01); *B60C 29/002* (2013.01); *B60C 29/064* (2013.01);
(Continued)

(58) Field of Classification Search
CPC ......... B60C 29/062; B60C 25/18; F16D 7/00; F16D 7/05; Y10T 137/6109
See application file for complete search history.

(56) References Cited

U.S. PATENT DOCUMENTS 1,433,131 A * 10/1922 Giddings, Jr. .......... B25B 27/24
29/214
1,757,006 A * 5/1930 Daniels ................... B25B 27/24
81/436
(Continued)

FOREIGN PATENT DOCUMENTS

WO           9826204 A1    6/1998

*Primary Examiner* — Robert K Arundale
(74) *Attorney, Agent, or Firm* — UB Greensfelder LLP; Brian E. Turung (57) ABSTRACT

An air chuck includes a body and a valve core interface. The body includes output, interface, and input ports. The body defines a first passageway that extends between the output and interface ports. The input port defines a second passageway that is in fluid communication with the first passageway. The valve core interface is slidably coupled with the body and is slidable between extended and retracted positions. The valve core interface includes a shaft and a knob. The shaft includes proximal and distal ends. The distal end is at least partially disposed in the first passageway. The knob is coupled with the proximal end of the shaft. The shaft is rotatably coupled with the body and is selectively rotatable in either tightening or loosening directions via the knob. The distal end of the shaft comprises a grasping feature that is configured to grasp a valve core of a valve stem.

19 Claims, 6 Drawing Sheets

Related U.S. Application Data (60) Provisional application No. 63/031,353, filed on May 28, 2020.

(51) Int. Cl.
 B60C 25/18 (2006.01)
 B60C 29/06 (2006.01)

(52) U.S. Cl.
 CPC ......... *B23B 31/16254* (2013.01); *B60C 25/18* (2013.01); *B60C 29/062* (2013.01); *Y10T 137/6109* (2015.04)

(56) References Cited

U.S. PATENT DOCUMENTS

| | | | |
|---|---|---|---|
| 1,854,797 A | | 4/1932 | Kirkpatrick |
| 2,320,042 A | * | 5/1943 | McMahan ............... B60C 5/004 141/38 |
| 2,581,914 A | | 1/1952 | Darrow |
| 2,592,759 A | | 4/1952 | Sullivan |
| 2,656,083 A | * | 10/1953 | Blomgren ............. B60C 29/062 251/351 |
| 3,021,877 A | * | 2/1962 | Wellsch ................. B60C 29/062 141/38 |
| 3,267,773 A | * | 8/1966 | Irwin ..................... B60C 29/062 81/52 |
| 3,561,090 A | * | 2/1971 | Fritch ...................... B23P 19/00 29/213.1 |
| 3,645,496 A | | 2/1972 | Rawlins |
| 3,718,057 A | | 2/1973 | Berchtold |
| 3,840,967 A | * | 10/1974 | Olson ...................... F25B 45/00 137/328 |
| 3,854,497 A | * | 12/1974 | Rosenberg ............ F16K 5/0605 137/557 |
| 3,861,249 A | | 1/1975 | Lindquist |
| 4,068,690 A | * | 1/1978 | Wyman ................. B60C 29/062 141/330 |
| 4,276,898 A | * | 7/1981 | Ross ..................... B29C 73/166 137/315.04 |
| 4,308,766 A | * | 1/1982 | Myers, Jr. ............. B29C 73/166 81/15.6 |
| 4,599,776 A | | 7/1986 | Haggard et al. |
| 5,665,908 A | * | 9/1997 | Burkey ................. B60C 29/062 137/228 |
| 5,803,108 A | * | 9/1998 | Schuessler, Jr. ...... B60C 29/062 137/15.08 |
| 6,035,885 A | * | 3/2000 | Schuessler, Jr ......... F16K 15/20 137/315.27 |
| 6,612,005 B2 | | 9/2003 | Rivers |
| 6,901,947 B2 | * | 6/2005 | Danielson ............... F16L 37/23 29/221.6 |
| 7,243,581 B1 | * | 7/2007 | Gao ....................... F16D 43/206 81/473 |
| 8,083,596 B1 | * | 12/2011 | Silver ....................... F16D 7/10 464/37 |
| 8,714,056 B2 | * | 5/2014 | Landowski ........... F16D 43/206 81/474 |
| 9,630,596 B2 | | 4/2017 | Zalzala |
| 2003/0066176 A1 | * | 4/2003 | Rivers .................... B25B 27/24 29/221.5 |
| 2008/0196789 A1 | * | 8/2008 | Hartl ..................... B29C 73/166 141/38 |
| 2009/0188570 A1 | | 7/2009 | Lin |
| 2013/0248001 A1 | * | 9/2013 | Young .................. F16K 31/163 137/14 |
| 2013/0333769 A1 | * | 12/2013 | Zalzalah ................ F16L 37/28 137/315.41 |
| 2014/0099428 A1 | * | 4/2014 | Paasch ................... B60S 5/046 427/140 |
| 2015/0094155 A1 | * | 4/2015 | Franceschi ............... F16D 7/08 464/32 |
| 2016/0272167 A1 | * | 9/2016 | Zalzalah ................ F16L 37/28 |
| 2018/0029318 A1 | | 2/2018 | Franklin |
| 2018/0297184 A1 | * | 10/2018 | Bailey ..................... F16D 7/08 |
| 2020/0269400 A1 | * | 8/2020 | Jones ..................... B25B 13/48 |
| 2021/0129605 A1 | * | 5/2021 | Huang ................... B60C 29/04 |
| 2021/0308848 A1 | * | 10/2021 | Widner ................. B25B 27/24 |

\* cited by examiner

PNEUMATIC CHUCK INCLUDING VALVE CORE INTERFACE

REFERENCE TO RELATED APPLICATION

This application is a continuation of U.S. patent application Ser. No. 17/323,582 filed May 18, 2021, which in turn claims priority of U.S. provisional patent application Ser. No. 63/031,353, entitled Pneumatic Chuck Including Valve Core Interface, filed May 28, 2020, and hereby incorporates these applications by reference herein in their entirety.

TECHNICAL FIELD

The apparatus and methods described below generally relate to a pneumatic chuck that includes a valve core interface that facilitates removal of a valve while the pneumatic chuck is attached to a valve stem.

BACKGROUND

Vehicular tires are typically inflated by mechanically coupling an air chuck with a valve stem on the tires until a given pressure is reached. For larger vehicular tires, such as those that are found on tractor trailers or heavy duty equipment, the valve core can be removed from the valve stem prior to inflating the tires to increase the fill rate of the tire. Removing the valve core however can increase the risk that the valve core is propelled towards a user, is inadvertently misplaced or lost, or allows for contaminants to be introduced into the interior of the tire. Additionally, the tire is typically overfilled to account for the air that inevitably escapes through the valve stem when the chuck is removed from the valve stem and the valve core is reinstalled, thus increasing the risk of the tire bursting. When the valve core is reinstalled, it is susceptible to being under tightened which can cause leakage or to being overtightened which can break the valve core.

BRIEF DESCRIPTION OF THE DRAWINGS

Various embodiments will become better understood with regard to the following description, appended claims and accompanying drawings wherein:

DETAILED DESCRIPTION

Figure 2:
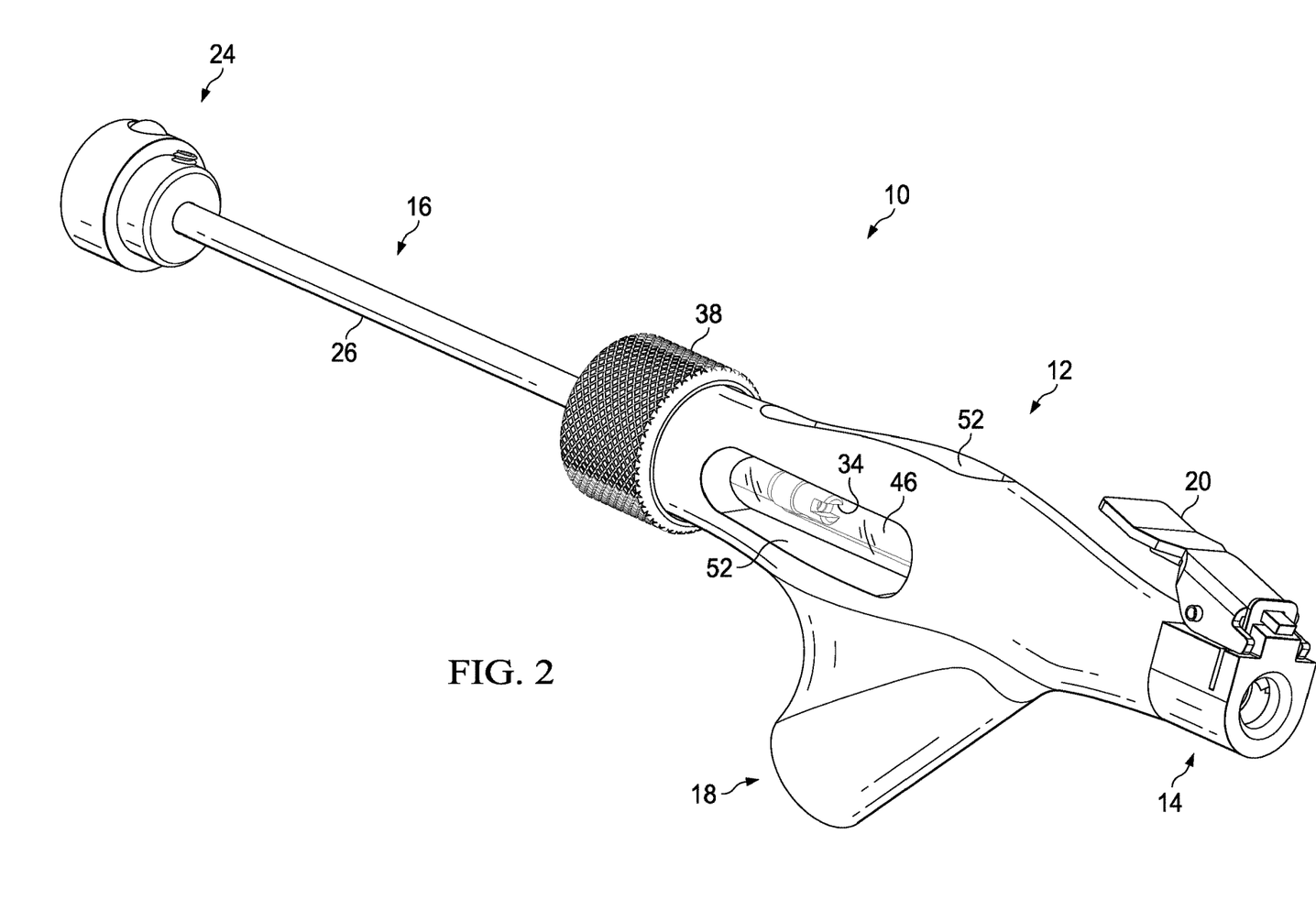
FIG. 2 is front isometric view of the air chuck of FIG. 1, but with the valve core interface shown in a retracted position.
Figure 3:
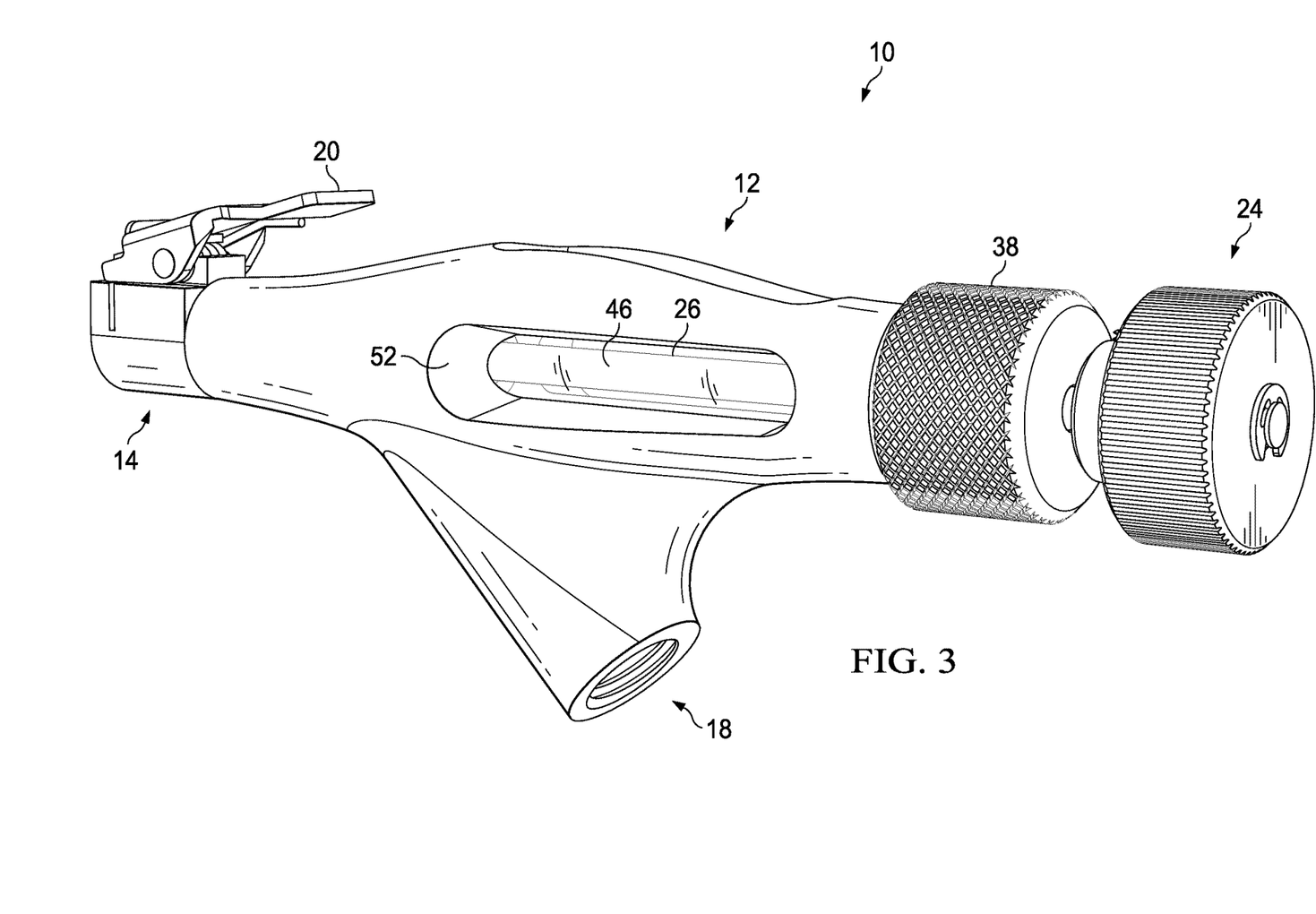
FIG. 3 is a rear isometric view of the air chuck of FIG. 1.
Figure 4:
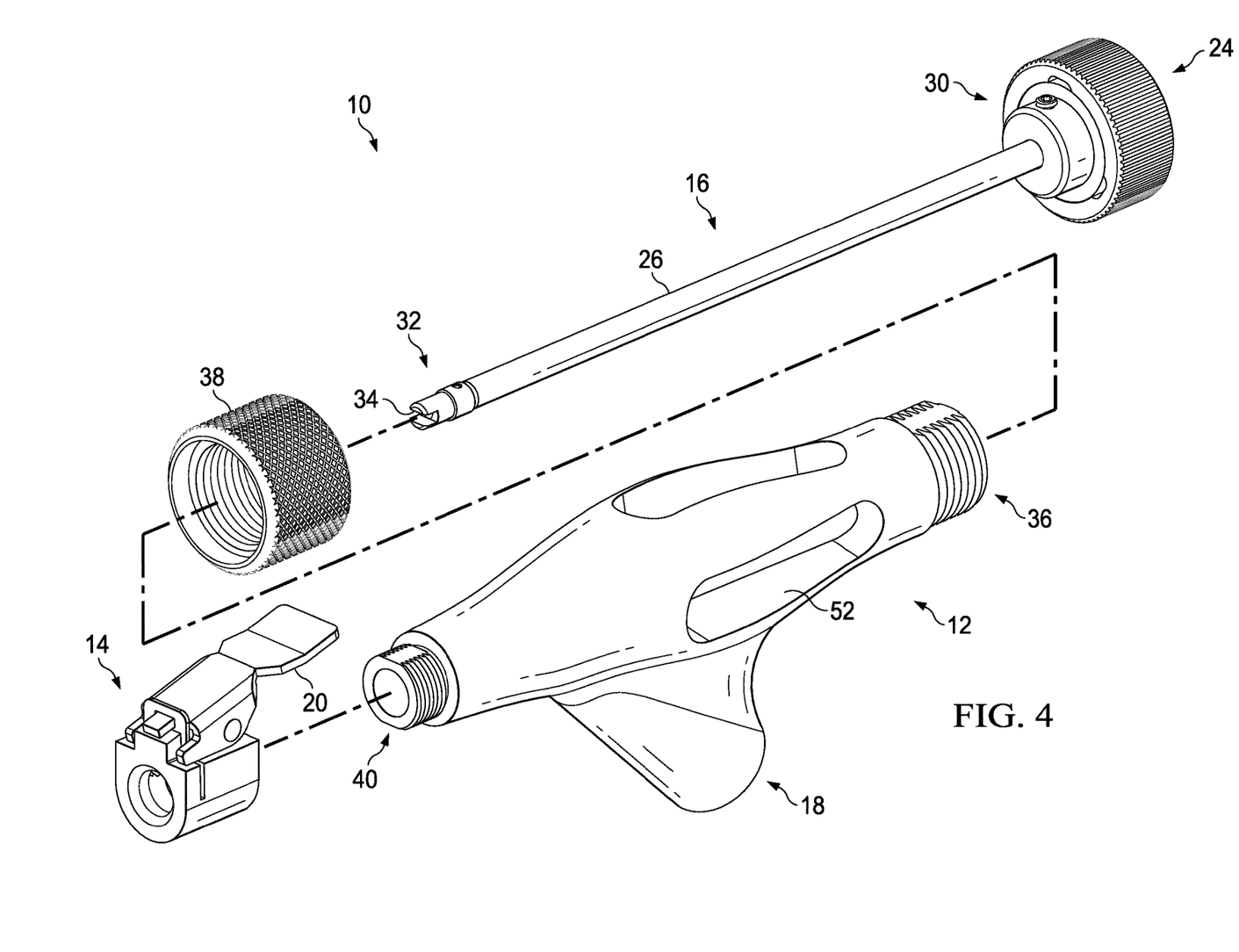
FIG. 4 is an exploded view of the air chuck of FIG. 1.

Embodiments are hereinafter described in detail in connection with the views and examples of FIGS. 1-6. An air chuck 10, in accordance with one embodiment, is generally depicted in FIGS. 1-5 and can include a body 12, an output fitting 14, and a valve core interface 16 (FIGS. 2 and 4). The body 12 can include an input port 18 that is configured for attachment to a pressurized fluid source (not shown), such as an air compressor. The input port 18 can be coupled to the fluid source via threaded attachment, a quick connect coupling, a fixed coupling (e.g., welded coupling), or any of a variety of other suitable alternative connections. The output fitting 14 can be in fluid communication with the input port 18 such that pressurized fluid from the input port 18 can flow to the output fitting 14 to facilitate inflation of a tire or other inflatable item with the air chuck 10.

The output fitting 14 can be configured for coupling with a valve stem (not shown) that is provided on a tire or other inflatable item. In one embodiment, the output fitting 14 can include a lever 20 that facilitates releasable coupling of the output fitting 14 onto the valve stem. In such an embodiment, when the output fitting 14 is initially installed on the valve stem, the output fitting 14 can interface with the valve stem to secure the output fitting 14 and the valve stem together during inflation. Once inflation is complete, the lever 20 can be depressed to release the output fitting 14 from the valve stem. It is to be appreciated that any of a variety of suitable alternative fittings can be provided for interacting with the valve stem or other type of input device during inflation with the air chuck 10.

Figure 1:
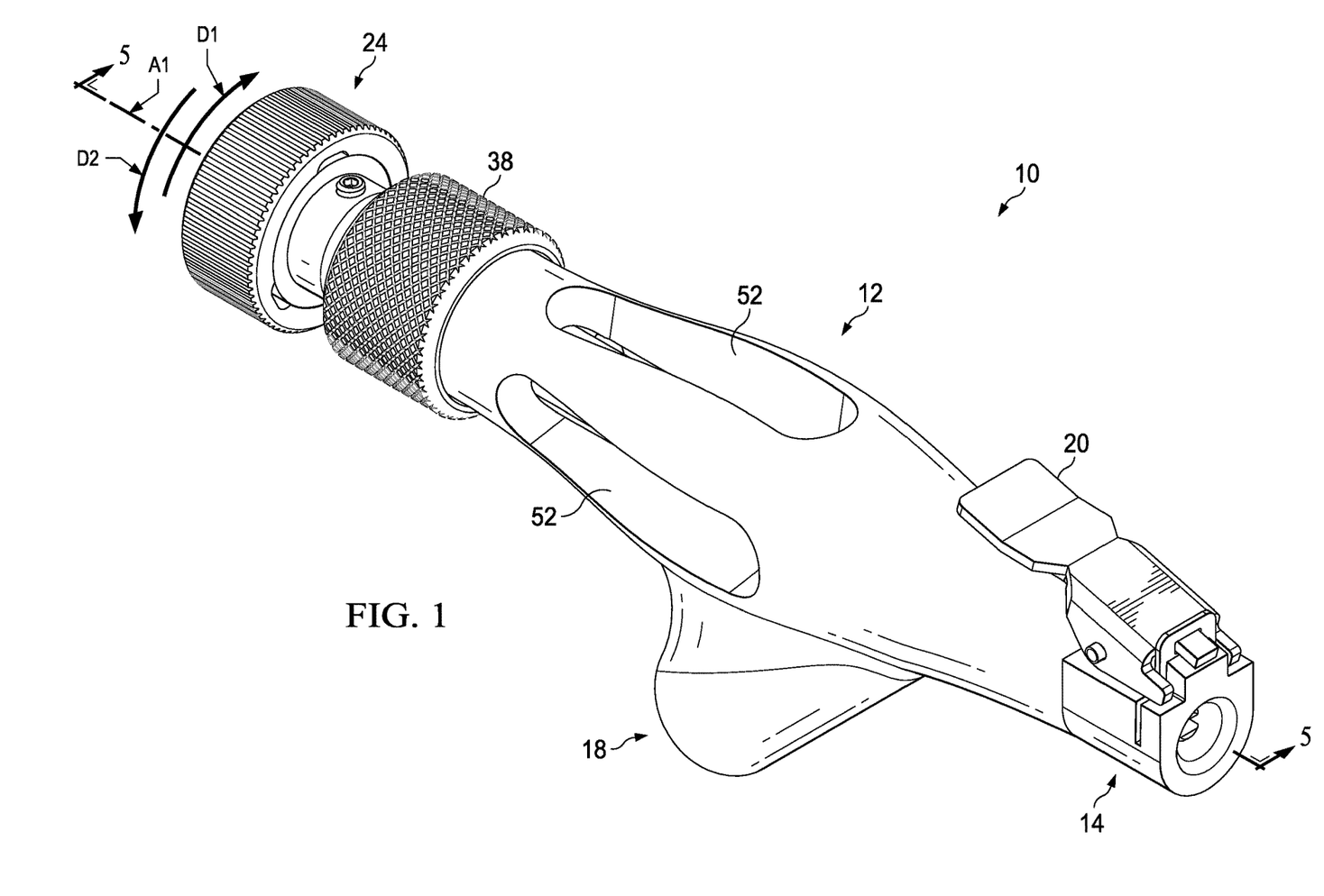
FIG. 1 is a front isometric view depicting an air chuck having a valve core interface shown in an installation position.

The valve core interface 16 can be rotatably coupled with the body 12 and rotatable with respect to the body 12 about an axis A1 in either of a counterclockwise (e.g., loosening) direction D1 or a clockwise (e.g., tightening) direction D2, as illustrated in FIG. 1. The valve core interface 16 can also be slidably coupled with the body 12 and slidable with respect to the body 12 between an extended position (FIGS. 1 and 3) and a retracted position (FIG. 2). As will be described in further detail below, when the air chuck 10 is installed on a valve stem, a user can slide and rotate the valve core interface 16 to facilitate removal of the valve core from the valve stem during inflation and to facilitate reinstallation of the valve core once inflation is complete.

Referring now to FIG. 4, the valve core interface 16 can include a knob 24 and a shaft 26. The shaft 26 can include a proximal end 30 and a distal end 32. The proximal end 30 of the shaft 26 can be coupled with the knob 24. The distal end 32 of the shaft 26 can include a fork 34 that is configured to grasp a valve core (not shown) of the valve stem during installation and removal. In one embodiment, the fork 34 can be configured to grasp the valve core in an interference-type fit. In some embodiments, the fork 34 can be magnetic such that the valve core is also grasped via magnetic attraction. It is to be appreciated that the distal end 32 of the shaft 26 can include any of a variety of suitable alterative grasping features that are configured to grasp a valve core during installation and removal.

The body 12 can include an interface port 36 that is configured to receive the shaft 26 of the valve core interface 16. The shaft 26 can extend through a cap 38 that facilitates slidable and rotatable coupling of the valve core interface 16 to the body 12. In one embodiment, the cap 38 can be threadably coupled with the interface port 36 but in other embodiments can be releasably coupled with the interface port 36 using any of a variety of suitable alternative arrangements (e.g., a bayonet connection). In another embodiment, the cap 38 can be fixedly coupled with the body 12 such as through welding, with an adhesive, or via any of a variety of suitable alternative arrangements.

The body 12 can include an output port 40 that is threadably coupled with the output fitting 14. It is to be appreciated, however, that any of a variety of suitable alternative coupling arrangements between the output fitting 14 and the output port 40 are contemplated, such as, for example, a bayonet connection, a quick connect coupling, or a fixed coupling (e.g., welded coupling), for example.

Figure 5:
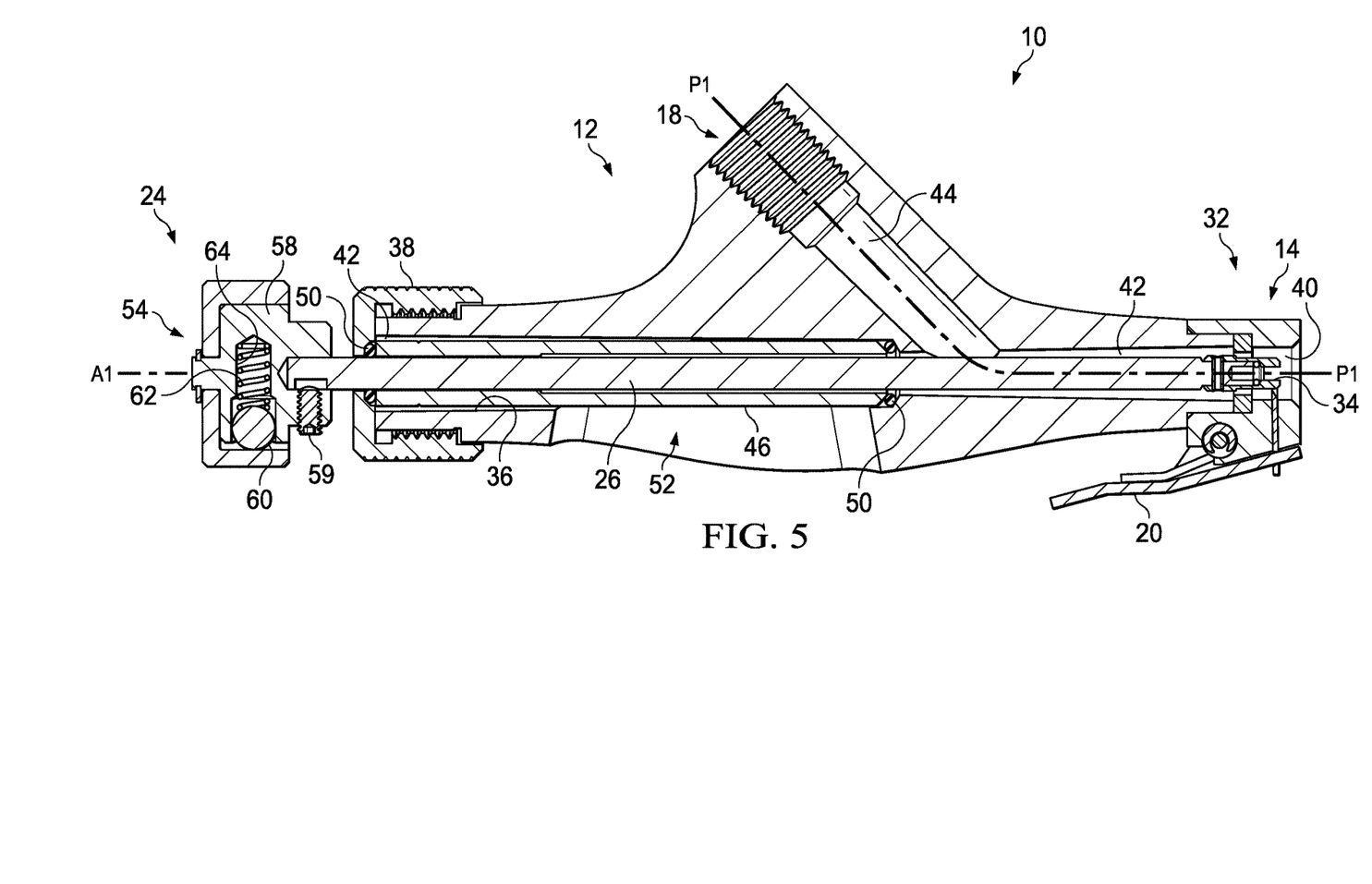
FIG. 5 is a sectional view taken along the line 5-5 in FIG. 1.

Referring now to FIG. 5, the body 12 can define a passageway 42 that extends between the interface port 36 and the output port 40. The distal end 32 of the shaft 26 can be at least partially disposed in the passageway 42. The input port 18 can define a passageway 44 that is in fluid communication with the passageway 42 to facilitate delivery of pressurized air through the passageway 44 and to the passageway 42 such that pressurized air introduced into the input port 18 can flow along a fluid path P1 from the input port 18 to the output port 40 and to an associated valve stem (not shown). An internal sleeve 46 can be disposed in the passageway 42 and can extend from the interface port 36 to a location adjacent to the passageway 44. The internal sleeve 46 can surround at least a portion of the shaft 26. When the valve core interface 16 is in the extended position, as illustrated in FIGS. 1, 3 and 5, the fork 34 on the distal end 32 of the shaft 26 can be adjacent to the output fitting 14 to allow the fork 34 to interface with a valve core (not shown). When the valve core interface 16 is in the retracted position, as illustrated in FIG. 2, the fork 34 can be disposed within the internal sleeve 46.

The internal sleeve 46 can be interposed between a pair of sealing arrangements 50. One of the sealing arrangements 50 can be adjacent the cap 38 and the other sealing arrangement can be disposed adjacent to the passageways 42, 44. The sealing arrangements 50 can be configured to substantially seal the interface between the body 12 and the internal sleeve 46 to prevent fluid in the passageway 42 from escaping. In one embodiment, as illustrated in FIG. 5, the sealing arrangements 50 can comprise O-rings, but any of a variety of suitable alternative sealing arrangements are contemplated.

The internal sleeve 46 can be formed of a substantially transparent material such as a clear polycarbonate, for example. As illustrated in FIGS. 1-3 and 5, the body 12 can define a plurality of elongated windows 52 that are disposed along the passageway 42 for viewing into the passageway 42 (e.g., through the internal sleeve 46) to allow a user to observe the positioning of the valve core on the fork 34 during installation and removal thereof. The elongated windows 52 allow for easier and faster installation and removal of the valve core to/from the valve stem than conventional air chuck arrangements. It is to be appreciated that although three elongated windows 52 are illustrated, any quantity (e.g., one, two, or more than three) and/or shape of windows is contemplated for viewing inside of the internal sleeve 46 (e.g., the passageway 42).

Figure 6:
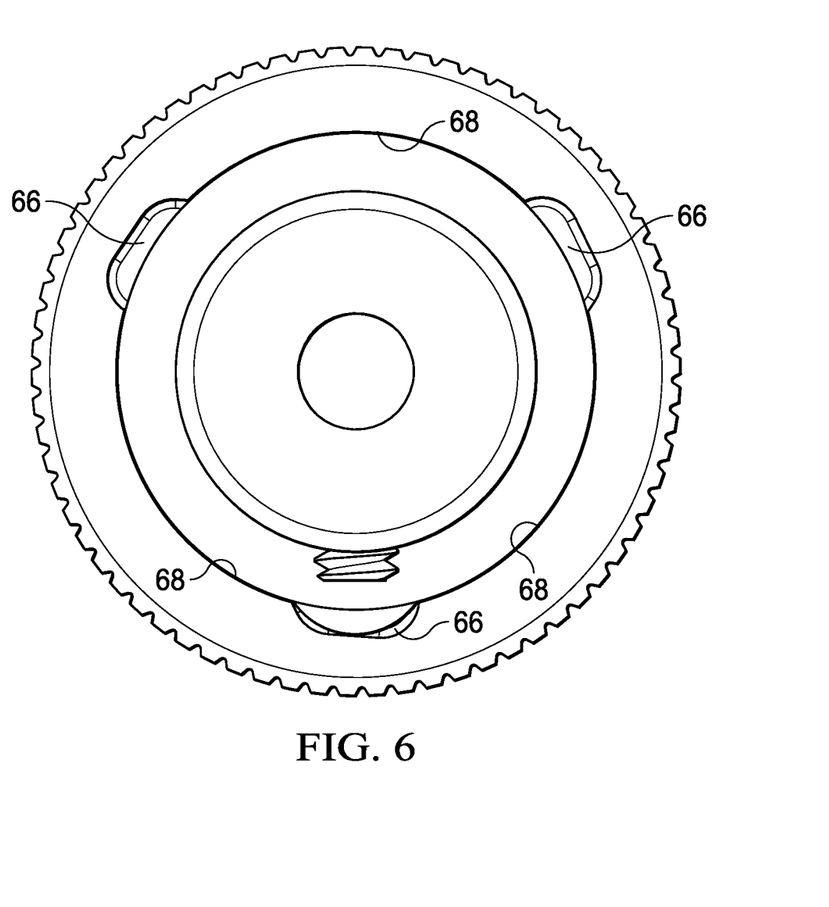
FIG. 6 is a bottom plan view of a knob and an inner core of the valve core interface of FIG. 1.

Referring again to FIG. 5, the valve core interface 16 can include a clutch assembly 54 that facilitates selective, operable coupling between the knob 24 and the shaft 26 as a function of rotational torque that is applied to the knob 24. In one embodiment, an inner core 58 can be coupled with the proximal end 30 (FIG. 4) of the shaft 26 via a set screw 59. The knob 24 can be rotatably coupled with the inner core 58 and the clutch assembly 54 can facilitate selective operable coupling between the knob 24 and the inner core 58. The clutch assembly 54 can include a ball 60 and a clutch spring 62 that are at least partially disposed within an elongate aperture 64 defined by the inner core 58. The ball 60 can be sandwiched between the clutch spring 62 and the knob 24 such that the clutch spring 62 biases the ball 60 towards the knob 24. As illustrated in FIG. 6, the knob 24 can define a plurality of interior slots 66 that are disposed circumferentially about an interior surface 68 of the knob 24.

During rotation of the knob 24, the ball 60 can extend into one of the interior slots 66 to couple the knob 24 and the inner core 58 together. The knob 24 and the inner core 58 can remain coupled together so long as the rotational torque applied to the knob 24 is less than a predefined threshold. Once the rotational torque applied to the knob 24 exceeds a predefined threshold, the ball 60 can slip out of the interior slot 66 and can slide along the interior surface 68 which can decouple the knob 24 from the inner core 58 (e.g., clutch out) to allow the knob 24 to rotate relative to the shaft 26 thereby preventing further rotation of the shaft 26. Such decoupling of the knob 24 from the inner core 58 can also provide audible and/or tactile feedback that indicates that proper torque on the valve core has been obtained to prevent possible undertorquing and overtorquing of the valve core as is common in conventional arrangements. In one embodiment, the predefined threshold can be between about 3 inch-pounds and about 5 inch-pounds, although any of a variety of predefined threshold values are contemplated. It is to be appreciated that the predefined threshold can be a function of the spring constant of the clutch spring 62, the configuration of the ball 60 and/or the configuration of the interior slots 66. It is also to be appreciated that any of a variety of suitable alternative clutch assemblies are contemplated for preventing over-torqueing of a valve stem with a valve core interface.

One example of the operation of the air chuck 10 will now be described. First, the output fitting 14 can be attached to a valve stem (not shown). The valve core interface 16 can then be slid into the installation position, and the position of the knob 24 can adjusted as needed until the fork 34 mates with and grasps the valve core. Once the fork 34 grasps the valve core, the knob 24 can then be rotated to unthread the valve core from the valve stem (e.g., in a counterclockwise direction D1 shown in FIG. 1). Once the valve core is unthreaded from the valve stem, the valve core interface 16 can be pulled into the retracted position (as illustrated in FIG. 2) via the knob 24 to extract the valve core from the valve stem. As the valve core interface 16 is moved into the retracted position, the fork 34 can be viewed through the elongated windows 52 (by a user) to ensure that that the valve core is seated on the fork 34. If the valve core is not present on fork 34, the valve core interface 16 can be returned to the installation position, the knob 24 can be rotated in an unthreading direction, and then pulled into the retracted position. This process can be repeated until the presence of the valve core on the fork 34 is confirmed through the elongated windows 52. The valve core interface 16 can then be slid into the retracted position, which can draw the valve core into the internal sleeve 46 and away from the fluid path P1. Pressurized air can then be provided into the input port 18 (e.g., though an upstream control valve) which can flow along the fluid path P1 and through the valve stem (without being obstructed by the valve core) to facilitate inflation of the vehicular tire. Once the tire has been inflated to the proper pressure, the flow of pressurized air can be stopped and the valve core interface 16 can be returned to the installation position. As the valve core interface 16 is returned to the installation position, the valve core can be observed through the elongated windows 52 to ensure that the valve core remains coupled with the fork 34. Once the valve core interface 16 reaches the installation position such that the valve core is positioned within the valve stem, the knob 24 can be rotated in a threading direction (e.g., in a clockwise direction D2 as illustrated in FIG. 1), to thread the valve core into the valve stem. Once the valve core reaches a proper torque, the knob 24 can clutch out to prevent further tightening of the valve core and to notify the user that the valve core is properly installed. It is to be appreciated that, during removal or installation from/to the valve stem, the elongated windows 52 can allow a user to observe whether the valve core has become inadvertently dislodged from the fork 34. If the valve becomes inadvertently dislodged from the fork 34, the air chuck 10 can be removed from the valve stem by depressing the lever 20, and the valve core can be retrieved from the air chuck 10 (e.g., by holding the air chuck 10 vertically until the valve core falls through the output fitting 14). Once the valve core is retrieved from the air chuck 10, the valve core can be manually threaded into the valve stem and the process described above can be performed again.

The foregoing description of embodiments and examples has been presented for purposes of illustration and description. It is not intended to be exhaustive or limiting to the forms described. Numerous modifications are possible in light of the above teachings. For example, although a pneumatic hose is described herein, it is to be appreciated that other types of fluid hoses are contemplated such as, for example, a water hose. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. An air chuck comprising: a body comprising: a first passageway that extends along a longitudinal length of said body between a proximal and distal end of said body; an output port that is in fluid communication with a first end of said first passageway; an input port that defines a second passageway that is in fluid communication with said first passageway at a first passageway interface; said input port is configured for attachment to a pressurized fluid source to facilitate delivery of pressurized fluid through said second passageway and to said first passageway; and a viewing arrangement formed in at least a portion of said body; said viewing arrangement positioned along at least a portion of said first passageway; a valve core interface that is slidably coupled with said body; said valve core is slidable between an extended position and a retracted position; said valve core interface includes: a shaft that includes a proximal end and a distal end; said distal end is at least partially disposed in said first passageway; and a knob coupled with to said proximal end of said shaft; and a sealing arrangement configured to inhibit pressurized fluid from exiting said body at a location that is distal to said first passageway interface; and wherein said shaft is rotatably coupled with said body and is selectively rotatable in either a tightening direction or a loosening direction via rotation of said knob; and wherein said distal end of said shaft includes a grasping feature that is configured to grasp a valve core of a valve stem; and wherein said view arrangement is configured to enable a user to view at least a portion of said shaft in said first passageway from outside of the body; and wherein at least a portion of said viewing arrangement is positioned on said body at a location that is distal to said first passageway interface.

2. The air chuck as defined in claim 1, wherein said view arrangement includes first and second windows that are spaced apart from one another.

3. The air chuck as defined in claim 1, further including a sleeve member; said sleeve member positioned at least partially in said first passageway and between said first passageway interface and said distal end of said body; said sleeve fully covering an underside of said viewing arrangement.

4. The air chuck as defined in claim 2, further including a sleeve member; said sleeve member positioned at least partially in said first passageway and between said first passageway interface and said distal end of said body; said sleeve fully covering an underside of said viewing arrangement.

5. The air chuck as defined in claim 3, wherein said sealing arrangement is positioned in both ends of said sleeve member.

6. The air chuck as defined in claim 4, wherein said sealing arrangement is positioned in both ends of said sleeve member.

7. The air chuck as defined in claim 3, wherein said sleeve is at least partially formed of a substantially transparent material.

8. The air chuck as defined in claim 6, wherein said sleeve is at least partially formed of a substantially transparent material.

9. The air chuck as defined in claim 1, further including a clutch assembly that facilitates selective operable coupling between said knob and said shaft as a function of rotational torque imparted to said knob; and wherein when said rotational torque that is applied to said knob is less than a predefined threshold, said knob and said shaft are rotatably coupled together via said clutch assembly to facilitate in rotation of said shaft; and wherein when said rotational torque that is applied to said knob exceeds said predefined threshold, said clutch assembly allows said knob to rotate relative to said shaft to prevent rotation of said shaft.

10. The air chuck as defined in claim 8, further including a clutch assembly that facilitates selective operable coupling between said knob and said shaft as a function of rotational torque imparted to said knob; and wherein when said rotational torque that is applied to said knob is less than a predefined threshold, said knob and said shaft are rotatably coupled together via said clutch assembly to facilitate in rotation of said shaft; and wherein when said rotational torque that is applied to said knob exceeds said predefined threshold, said clutch assembly allows said knob to rotate relative to said shaft to prevent rotation of said shaft.

11. An air chuck comprising: a body comprising: a first passageway that extends along a longitudinal length of said body between a proximal and distal end of said body; an output port that is in fluid communication with a first end of said first passageway; an input port that defines a second passageway that is in fluid communication with said first passageway at a first passageway interface; said input port is configured for attachment to a pressurized fluid source to facilitate delivery of pressurized fluid through said second passageway and to said first passageway; and a viewing arrangement formed in at least a portion of said body; said viewing arrangement positioned along at least a portion of said first passageway; a valve core interface that is slidably coupled with said body; said valve core is slidable between an extended position and a retracted position; said valve core interface includes: a shaft that includes a proximal end and a distal end; said distal end is at least partially disposed in said first passageway; and a knob coupled with to said proximal end of said shaft; and a sealing arrangement configured to inhibit pressurized fluid from exiting said body at a location that is distal to said first passageway interface; a sleeve member; said sleeve member positioned at least partially in said first passageway and between said first passageway interface and said distal end of said body; said sleeve fully covering an underside of said viewing arrangement; and wherein said shaft is rotatably coupled with said body and is selectively rotatable in either a tightening direction or a loosening direction via rotation of said knob; and wherein said distal end of said shaft includes a grasping feature that is configured to grasp a valve core of a valve stem; and wherein said viewing arrangement is configured to enable a user to view at least a portion of said shaft in said first passageway from outside of the body.

12. The air chuck as defined in claim 11, wherein said viewing arrangement includes first and second windows that are spaced apart from one another.

13. The air chuck as defined in claim 11, wherein said sealing arrangement is positioned in both ends of said sleeve member.

14. The air chuck as defined in claim 12, wherein said sealing arrangement positioned is in both ends of said sleeve member.

15. The air chuck as defined in claim 11, wherein said sleeve is at least partially formed of a substantially transparent material.

16. The air chuck as defined in claim 14, wherein said sleeve is at least partially formed of a substantially transparent material.

17. The air chuck as defined in claim 11, further including a clutch assembly that facilitates selective operable coupling between said knob and said shaft as a function of rotational torque imparted to said knob; and wherein when said rotational torque that is applied to said knob is less than a predefined threshold, said knob and said shaft are rotatably coupled together via said clutch assembly to facilitate in rotation of said shaft; and wherein when said rotational torque that is applied to said knob exceeds said predefined threshold, said clutch assembly allows said knob to rotate relative to said shaft to prevent rotation of said shaft.

18. The air chuck as defined in claim 16, further including a clutch assembly that facilitates selective operable coupling between said knob and said shaft as a function of rotational torque imparted to said knob; and wherein when said rotational torque that is applied to said knob is less than a predefined threshold, said knob and said shaft are rotatably coupled together via said clutch assembly to facilitate in rotation of said shaft; and wherein when said rotational torque that is applied to said knob exceeds said predefined threshold, said clutch assembly allows said knob to rotate relative to said shaft to prevent rotation of said shaft.

19. An air chuck comprising: a body comprising: a first passageway that extends along a longitudinal length of said body between a proximal and distal end of said body; an output port that is in fluid communication with a first end of said first passageway; an input port that defines a second passageway that is in fluid communication with said first passageway at a first passageway interface; said input port is configured for attachment to a pressurized fluid source to facilitate delivery of pressurized fluid through said second passageway and to said first passageway; and a viewing arrangement formed in at least a portion of said body; said viewing arrangement positioned along at least a portion of said first passageway; a valve core interface that is slidably coupled with said body; said valve core is slidable between an extended position and a retracted position; said valve core interface includes: a shaft that includes a proximal end and a distal end; said distal end is at least partially disposed in said first passageway; and a knob coupled with to said proximal end of said shaft; and a sleeve member; said sleeve member positioned at least partially in said first passageway and between said first passageway interface and said distal end of said body; said sleeve fully covering an underside of said view arrangement a lower portion; said sleeve is at least partially formed of a substantially transparent material; and wherein said shaft is rotatably coupled with said body and is selectively rotatable in either a tightening direction or a loosening direction via rotation of said knob; and wherein said distal end of said shaft includes a grasping feature that is configured to grasp a valve core of a valve stem; and wherein said viewing arrangement is configured to enable a user to view at least a portion of said shaft in said first passageway from outside of the body.

* * * * *